United States Patent
Hommel et al.

(10) Patent No.: US 8,817,138 B2
(45) Date of Patent: Aug. 26, 2014

(54) CAMERA VIEWFINDER WITH CONTINUOUS VARIABLE ADJUSTABLE COLOUR TEMPERATURE

(75) Inventors: John Hommel, Nieuw Vossemeer (NL); Aart-Jan Vogel, Middelburg (NL); Martin De Boer, Den Haag (NL); Florus Bernardus Van Den Herik, Oosterhout (NL)

(73) Assignee: GVBB Holdings S.A.R.L., Luxembourg (LU)

( * ) Notice: Subject to any disclaimer, the term of this patent is extended or adjusted under 35 U.S.C. 154(b) by 6 days.

(21) Appl. No.: 13/640,179

(22) PCT Filed: Mar. 30, 2011

(86) PCT No.: PCT/EP2011/054955
§ 371 (c)(1),
(2), (4) Date: Dec. 20, 2012

(87) PCT Pub. No.: WO2011/124514
PCT Pub. Date: Oct. 13, 2011

(65) Prior Publication Data
US 2013/0093935 A1    Apr. 18, 2013

(30) Foreign Application Priority Data

Apr. 9, 2010   (EP) .................................... 10305368

(51) Int. Cl.
*H04N 5/20*   (2006.01)
*H04N 9/73*   (2006.01)

(52) U.S. Cl.
USPC .................... 348/255; 348/228.1; 348/333.01

(58) Field of Classification Search
CPC ...... H04N 5/23293; H04N 5/243; H04N 9/73
USPC .......... 348/333.01, 333.12, 223.1, 255, 228.1
See application file for complete search history.

(56) References Cited

U.S. PATENT DOCUMENTS

| 5,132,825 | A  |   | 7/1992 | Miyadera |
| 5,345,275 | A  | * | 9/1994 | Lendaro ........................ 348/656 |
| 6,724,422 | B1 | * | 4/2004 | Werner ......................... 348/187 |
| 7,551,207 | B2 | * | 6/2009 | Yuyama ...................... 348/223.1 |
| 2002/0118967 | A1 | * | 8/2002 | Funston ........................ 396/155 |
| 2007/0002150 | A1 | * | 1/2007 | Abe ........................... 348/223.1 |
| 2007/0126887 | A1 |   | 6/2007 | Chino et al. |

FOREIGN PATENT DOCUMENTS

JP         05-316528        11/1993
WO     WO-2009/061296       5/2009

OTHER PUBLICATIONS

International Search Report for International Application No. PCT/EP2011/054955, mailed May 24, 2011, 3 pages.
Written Opinion for International Application No. PCT/EP2011/054955, mailed May 24, 2011 by the EPO/ISA, 6 pages.

* cited by examiner

*Primary Examiner* — Ngoc-Yen Vu
(74) *Attorney, Agent, or Firm* — Arent Fox LLP

(57) ABSTRACT

A viewfinder of an electronic camera includes a color display monitor that is adapted to display a scene captured by an image sensor arrangement of the camera. The color temperature of the viewfinder is continuously variable adjustable between a minimum and a maximum value. The color temperature adjustment of the viewfinder does not affect the color temperature of a video signal produced by the camera that is recorded or transmitted.

12 Claims, 1 Drawing Sheet

CAMERA VIEWFINDER WITH CONTINUOUS VARIABLE ADJUSTABLE COLOUR TEMPERATURE

CROSS-REFERENCE TO RELATED APPLICATIONS

This application is a United States National Stage Application under 35 U.S.C. §371 of International Patent Application No. PCT/EP2011/054955, filed Mar. 30, 2011, which claims the benefit to European Patent Application No. 10305368.2, filed Apr. 9, 2010, each of which is incorporated by reference into this application as if fully set forth herein.

The invention pertains to a camera viewfinder, in particular to a colour viewfinder, having a continuously variable adjustable colour temperature.

Colour temperature is a characteristic of visible light that has important applications in lighting, photography, videography, publishing, manufacturing, astrophysics, and other fields. The colour temperature of a light source is the temperature of an ideal black-body radiator that radiates light of comparable hue to that light source. The temperature is conventionally stated in units of absolute temperature, Kelvin (K).

Higher colour temperatures (5,000 K or more) are called cool colours (bluish white); lower colour temperatures (2,700-3,000 K) are called warm colours (yellowish white through red).

Analogue film sometimes appears to exaggerate the colour of the light, since it does not adapt to lighting colour as human visual perception does. An object that appears to the eye to be white may turn out to look very blue or orange in a photograph. The colour balance may need to be corrected while shooting or while electronically scanning to achieve a neutral colour rendering on a monitor. This step may also be done in post processing, i.e. after the video images are captured and stored. The same is true for electronic video cameras, which typically capture colour images in corresponding representations in red, green and blue colour. The individual colours coming from the image sensor arrangement may not be balanced so as to immediately produce correct colour rendering on monitors. Colour correction may be done individually for different reproduction devices. Colour correction once applied to a video signal, however, may not necessarily be appropriate for every kind of reproduction device to the same extent.

Figure 1:
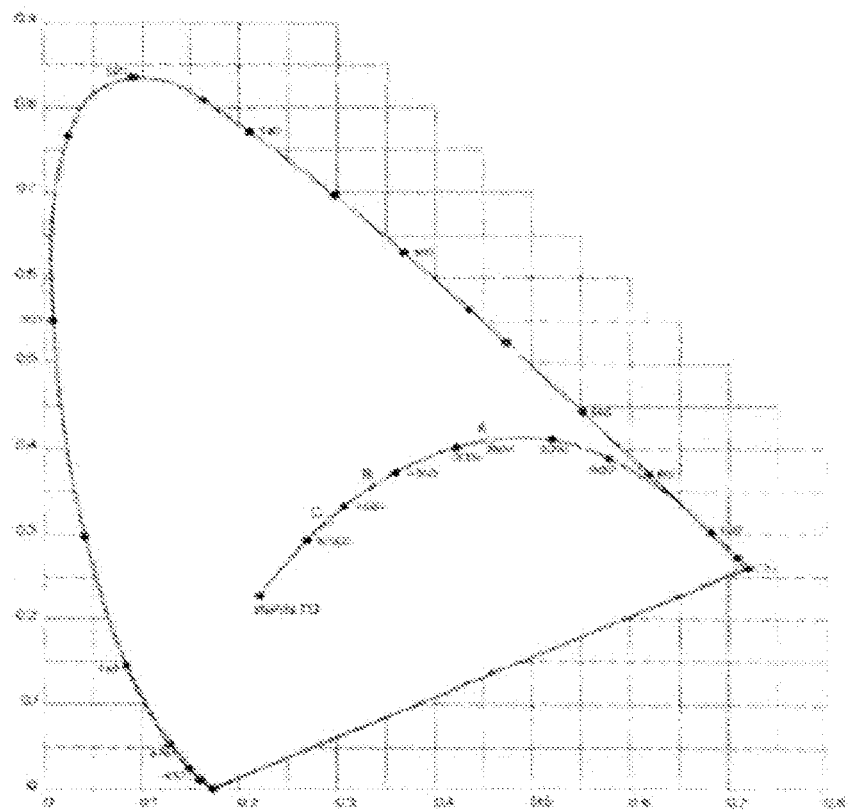
FIG. 1 depicts a colour diagram according to one aspect of the present disclosure.

Some colour monitors for computers allow for selecting amongst preset colour temperatures like 3200K, 5600K, 9300K, in order to compensate for inappropriate colour correction of a video signal for the respective device, or shifts in colour temperature introduced during transmission, manipulation or transformation of the video signal. Some computer monitors even allow for arbitrarily selecting a colour temperature in a certain range, e.g. the Dell™ Ultrascan P780 Color Monitor allows for specifying any colour temperature between 9300K and 5000K, a given step size applying.

However, the standard colour temperature for most camera viewfinders is fixedly set to 6500K and cannot be adjusted.

Depending on the selected colour temperature of the recording camera, a difference in colour temperature between the camera and the default value of 6500K of the viewfinder can be noticed on the viewfinder display. This may make operation of the camera more difficult, notably if a camera operator wants to focus on am object having a particular colour or hue, because the object may have a different appearance in reality and on the viewfinder. This is a unique situation for a camera operator, because only a person present during capture will be able to see the difference, and may notice the disturbing effect.

It is desirable to provide a camera viewfinder having a continuous variable colour control allowing for matching the colour rendering on the viewfinder with the real scene.

A viewfinder of an electronic camera in accordance with the invention includes a colour display monitor, adapted to display a scene captured by an image sensor arrangement of the camera. The colour temperature of the viewfinder is continuously variable adjustable between a minimum and a maximum value. The colour temperature adjustment of the viewfinder does not affect the colour temperature of a video signal produced by the camera that is recorded or transmitted.

According to one aspect of the invention a camera operator can continuously variable change the colour temperature of the viewfinder display, which, by default, may be set to 6500K, to a different value without changing the signal output by the camera for transmission or recording. Changing the colour temperature of the viewfinder display may be effected in such a way that the colour temperature of a scene visible on the display substantially or fully also matches with what is visible in the real life scene when recording.

A camera operator using the inventive viewfinder will be less distracted by colour differences between the real life scene and what is visible on the viewfinder display, which in turn may alleviate finding optimal focus, or image composition and the like.

In one embodiment the video signals provided to the viewfinder by the camera include the luminance signal Y and the colour difference signals Cr and Cb. By means of a matrix, e.g. 3×3 or a larger or smaller matrix, these signals are transformed into corresponding primary colour signals R, G and B, for red, green and blue.

In another embodiment, the video signals provided to the viewfinder correspond to the video signals for red, green and blue as provided from corresponding image sensors for the respective colours.

In a video processing circuit associated with the viewfinder the gain of the three colour signals R, G and B is controlled to obtain the desired colour temperature, notably with respect to white image content.

In the CIE1931 colour diagram a locus can be found representing different white points having different colour temperatures. As mentioned further above, the colour temperature is expressed in degrees Kelvin.

FIG. 1 shows the known CIE1931 colour diagram. The curve inside the border represents various temperatures for white.

When calibrating the default colour temperature of the viewfinder for white image content the gain of R, G and B is set and stored in such a way that white image content that is reproduced on the viewfinder has to a colour temperature of 6500K or a value close to this value.

In one embodiment of the invention, when the camera operator adjusts the viewfinder colour temperature the gain for one colour component, for example green, or G, is maintained constant and the gains for the other colour components, e.g. R and B, or red and blue, respectively, are adjusted.

Figure 2:
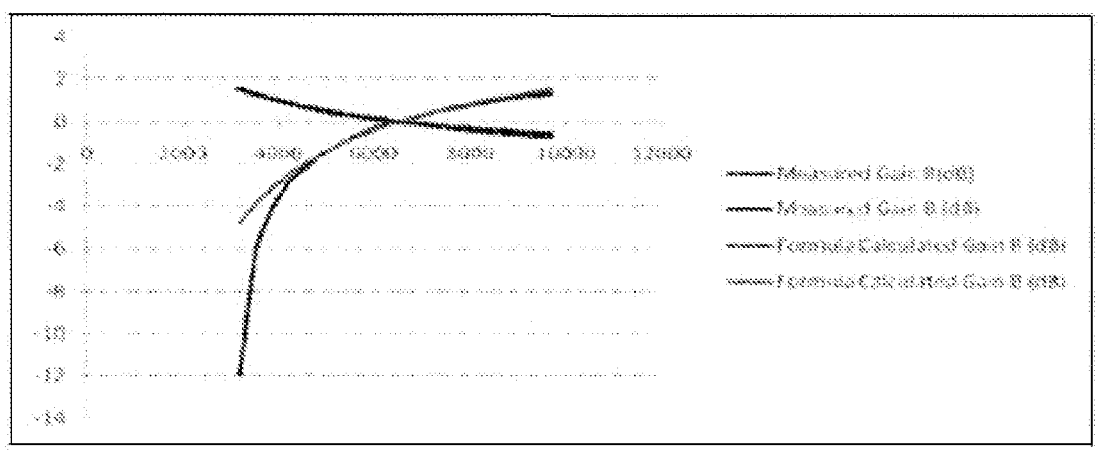
FIG. 2 illustrates a relationship between a gain and a colour temperature according to one aspect of the present disclosure.

FIG. 2 shows an exemplary relation between a variable gain of R and B compared to the fixed gain of G and its effect on the colour temperature. As can be seen, in the exemplary embodiment the colour temperature can be continuously variable adjusted to values between 3000K and 9000K. In the figure, measured gain values and values calculated in accordance with the following formulae are shown. The x-axis represents the colour temperature and the y-axis represents changes of the respective gain in dB.

The gains for R and B are calculated as follows:

$$\text{Gain } R=((6500-C\text{Temp})*10030)/(65*C\text{Temp})$$

$$\text{Gain } B=((C\text{Temp}-6500)*30000)/(65*C\text{Temp})$$

In the preceding formulae CTemp corresponds to the colour temperature. The formulae represent an approximation that is sufficiently precise yet simple to calculate.

The result is that a continuously variable shift of the colour temperature is possible to a lower or higher colour temperature.

The invention may also be implemented through corresponding control of the luminance and colour difference signals, while still providing the same result.

The invention claimed is:

1. A viewfinder of an electronic camera comprising:
    a color display monitor adapted to display a scene captured by an image sensor arrangement of the camera,
    wherein the color temperature of the viewfinder is continuously variable adjustable between a minimum and a maximum value, wherein the color temperature can be adjusted by maintaining constant the gain for one primary color component of a video signal and varying the gains for the other primary color components of the video signal, wherein the gain for the red color component is calculated in accordance with the formula:

$$\text{Gain } R=((6500-C\text{Temp})*10030)/(65*C\text{Temp}),$$
    wherein CTemp is the color temperature, and wherein the color temperature adjustment of the viewfinder does not affect the color temperature of a video signal produced by the camera that is recorded or transmitted.

2. The viewfinder according to claim 1, wherein the gain for the green color component is maintained constant.

3. The viewfinder according to claim 1, wherein the gain for the blue color component is calculated in accordance with the formula:

$$\text{Gain } B=((C\text{Temp}-6500)*30000)/(65*C\text{Temp})$$
    wherein CTemp is the color temperature.

4. The viewfinder of claim 1, wherein the color temperature of the viewfinder is initially set to approximately 6500K.

5. The viewfinder of claim 4, wherein the color temperature is continuously variable between approximately 3000K and 9000K.

6. The viewfinder of claim 1, wherein the gains for the other primary color components of the video signal are varied in order to adjust the color temperature along a locus of white points having different color temperatures.

7. A viewfinder of an electronic camera comprising:
    a color display monitor adapted to display a scene captured by an image sensor arrangement of the camera,
    wherein the color temperature of the viewfinder is continuously variable adjustable between a minimum and a maximum value, wherein the color temperature can be adjusted by maintaining constant the gain for one primary color component of a video signal and varying the gains for the other primary color components of the video signal, wherein the gain for the blue color component is calculated in accordance with the formula:

$$\text{Gain } B=((C\text{Temp}-6500)*30000)/(65*C\text{Temp}),$$
    wherein CTemp is the color temperature, and wherein the color temperature adjustment of the viewfinder does not affect the color temperature of a video signal produced by the camera that is recorded or transmitted.

8. The viewfinder according to claim 7, wherein the gain for the green color component is maintained constant.

9. Viewfinder according to claim 8, wherein the gain for the red color component is calculated in accordance with the formula:

$$\text{Gain } R=((6500-C\text{Temp})*10030)/(65*C\text{Temp}),$$
    wherein CTemp is the color-temperature.

10. The viewfinder of claim 7, wherein the color temperature of the viewfinder is initially set to approximately 6500K.

11. The viewfinder of claim 10, wherein the color temperature is continuously variable between approximately 3000K and 9000K.

12. The viewfinder of claim 7, wherein the gains for the other primary color components of the video signal are varied in order to adjust the color temperature along a locus of white points having different color temperatures.

* * * * *